United States Patent Office 3,213,121
Patented Oct. 19, 1965

3,213,121
SYNTHESIS OF 3-ARYL-1 METHYL-1-METHOXY UREAS
Donald L. Smathers, Wilmington, Del., assignor to E. I. du Pont de Nemours and Company, Wilmington, Del., a corporation of Delaware
No Drawing. Filed June 22, 1959, Ser. No. 821,641
2 Claims. (Cl. 260—453)

This invention relates to the preparation of 1-methoxy-1-methyl-3-aryl ureas and is more particularly directed to processes which can be conducted in a single vessel starting with an aryl isocyanate and a hydroxylamine of Formula 2 and followed by a methylation.

It is most surprising that methylation of a compound of the following structure can be effected selectively on the aliphatic nitrogen or on the oxygen attached thereto:

1)
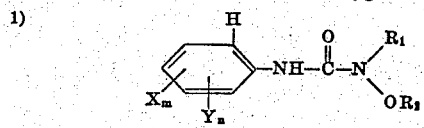

where
X=H, Cl
m=1, 2, 3
Y=H, CH$_3$
n=1, 2
R$_1$, R$_2$=H, CH$_3$ and at least one of R$_1$ and R$_2$=H According to the present invention it has been ascertained that by methylation as hereinafter described the hydrogen groups represented in the above by R$_1$ and R$_2$ can be replaced by methyl groups.

From the knowledge of the prior art, one would expect that the aryl nitrogen would be methylated preferentially to the aliphatic nitrogen, particularly because it is more acidic. Such acidic nitrogens are well understood to have a greater affinity for the methyl group in a methylation reaction.

Therefore, it might be expected that if the compound above were treated with a methylating agent one would obtain a methyl group only on the aromatic nitrogen or might obtain no methylation at all. If neither of these occurred, one might expect rearrangement of the structure under conditions severe enough to effect methylation.

Surprisingly it has been found that if the compound above listed is methylated as herein described, the hydrogen on the aliphatic nitrogen can easily be replaced in good yield and without affecting the hydrogen group on the aromatic nitrogen.

The reaction of an aryl isocyanate with a hydroxylamine proceeds as follows:

(2)
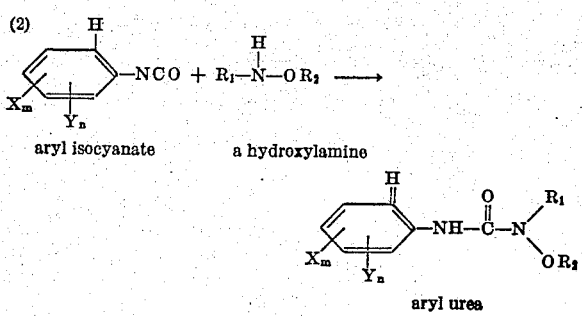

The product of reaction thus obtained together with the solvent or solvents in which it is conducted can without intermediate separation of product be used in the methylation step. The solvents which can be used include such common reaction media as dioxane, alcohol, cyclohexanol, isopropanol, and other such reaction media which do not react with the hydroxylamine. It will ordinarily be desirable to add water if this was not used as a solvent or carrier in the first step.

The methylation proceeds as follows:

(3)
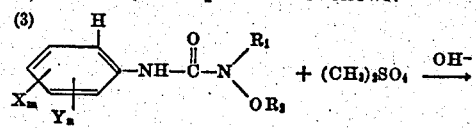

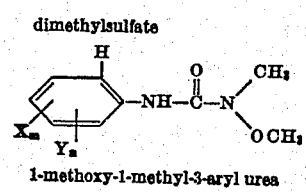

1-methoxy-1-methyl-3-aryl urea where
X=H, Cl
m=1, 2, 3
Y=H, CH$_3$
n=1, 2
R$_1$, R$_2$=H, CH$_3$ and at least one of R$_1$ and R$_2$=H According to the present invention the sequence of reactions is conducted in such a manner that the aryl ureas can readily be converted to the 1-methoxy-1-methyl-3 aryl ureas to be produced according to the invention using the same equipment and without an intermediate separation of products.

The methylation is preferably conducted in water, the product of Formula 1 being present as a dispersion and thus slurried in water. A solvent such as above described can also be present. The compound of Formula 1 can be entirely dissolved in the water-solvent system or can be present only as a slurry in which the compound is but little dissolved.

The temperatures of the methylation should be enough above freezing so that the system will not be solid. Otherwise it cannot be handled. Temperatures as low as are practical can be used. Higher temperatures can be employed and where R$_2$ is hydrogen the temperature should not greatly exceed 20° C. Where R$_2$ is methyl the temperature may go as high as the reflux temperature of the particular system, whether water alone or water with another solvent. It is preferable, ordinarily, to use temperatures not greatly in excess of 90° C. Because of the high expense of cooling and the relative stabilities of the starting amines, it is easily seen that ordinarily it will be preferred to use O-methylhydroxylamine as the starting amine.

Any methylating agent such as one from the group consisting of dimethylsulfate and methyl halides such as methyl chloride, methyl bromide, and methyl iodide, is added to the compound 1 in water or other liquid, as described, together with a suitable base. The amount of methylating agent can be that customarily used, say 2 to 4 molecular equivalents. The amount of base and rate of addition is so adjusted that the pH remains between 7 and 11. As shown one may use sodium hydroxide, potassium hydroxide, sodium or potassium carbonate, and other such commonly employed bases.

The methylation should of course be conducted with good stirring so that local concentrations of the methylating agent are avoided as otherwise the use of the methylating agent will be excessive.

The present process has the advantage that it uses readily available raw materials of comparatively low cost for the production of 1-methoxy-1-methyl-3-aryl ureas. Ordinarily one might attempt to produce such an aryl urea by reaction of an aryl isocyanate with an appropriate amine. The amine to produce the products desired not commercially available and cannot readily be prepared.

The processes above generally described can be illustrated with a typical aryl isocyanate and with three different amines.

ARYL ISOCYANATE PLUS HYDROXYLAMINE

To a well-stirred 2 to 20%, preferably 5 to 10%, aqueous solution of hydroxylamine, maintained at temperatures between −10° C. and +20° C., preferably −10° C. to 0° C., is added between 0.25 and 1, preferably 0.8–1, molecular equivalents of 3,4-dichlorophenylisocyanate, optionally dissolved in a water-miscible, inert solvent such as dioxane. The rate of addition will vary with the size of the run and the effectiveness of the cooling bath (highly exothermic reaction) but generally will require between 5 and 120 minutes, preferably 10–20 minutes. The resulting reaction mixture can be used directly although it becomes more tractable if water is added and it is allowed to stir for 10–45 minutes before proceeding.

The reaction as just described proceeds as follows:

(4)
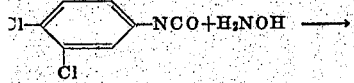
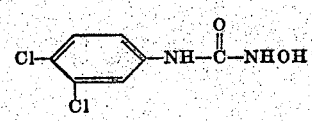

The reaction mixture obtained as above is used in the following methylation. Between 2 and 4, preferably 2.5 to 3, molecular equivalents, based on hydroxylamine, of an alkali or alkaline earth base, such as sodium hydroxide, dissolved in water, is added at temperatures between −5° and 20° C., preferably between 5° C. and 10° C. This is followed by the addition of between 2 and 4, preferably 2.5 to 3, molecular equivalents of dimethyl sulfate at such a rate that the temperature stays in the range between 5° C. and 25° C., preferably 10° C. to 15° C. When addition is complete, the reaction mixture is allowed to warm spontaneously but is restrained from exceeding 35° C. to 40° C. The substantially pure product is recovered by filtration.

The reaction just described proceeds as follows:

(5)
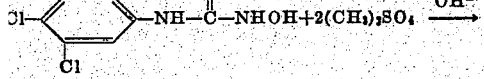
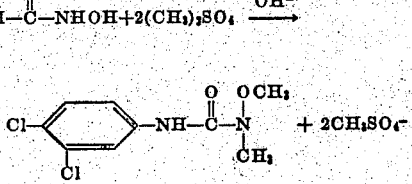

Instead of proceeding with the methylation as above, one can instead add to the reaction mixture between 2 and 4 molecular equivalents of dimethylsulfate simultaneously with aqueous base so that the mixture is in the range of pH −11, preferably 8–9, and the temperature lies between 5° C. and 20° C., preferably 5° to 10° C. When addition of the dimethylsulfate is complete, the reaction mixture is allowed to warm spontaneously, but is restrained from exceeding a temperature of 35° C. to 40° C., adding aqueous base as needed to maintain the pH in the above range. The product is recovered by filtration.

ARYL ISOCYANATE PLUS N-METHYL-HYDROXYLAMINE

The reduction of nitromethane to N-methylhydroxylamine is described by Beckmann, Ann., 365, 211 (1909). Nitromethane is reduced by zinc in an aqueous ammonium chloride solution. The resulting solution of N-methylhydroxylamine is filtered to remove zinc salts, cooled to −10° to +20° C., preferably −10° to 0° C., stirred well, and between 0.2 and 0.8, preferably 0.4–0.5 molecular equivalents, based on nitromethane, of 3,4-dichlorophenylisocyanate is added, optionally dissolved in a water-miscible, inert solvent such as dioxane. The rate of addition will vary with the size of the run and the effectiveness of the cooling bath (highly exothermic reaction), but will generally require 5 to 120 minutes, preferably 10–20 minutes. The resulting mixture can be used directly in the methylation step, but we have found that there is more economical consumption of dimethylsulfate if the supernatent liquid is siphoned off and replaced with an approximately equal volume of water.

The reaction just described proceeds as follows:

(6)
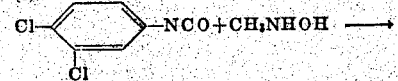
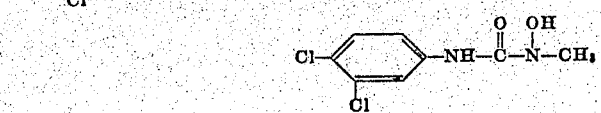

Between 1 and 2, preferably 1–1.2 molecular equivalents, based on isocyanate, of an alkali or alkaline earth base, such as sodium hydroxide, dissolved in water, is added to the reaction product obtained as above at temperatures between −5° C. and +20° C., preferably 0° C. to 5° C. This is followed by the addition of between 1 and 2, preferably 1–1.2, molecular equivalents of dimethyl sulfate. When addition is complete, the mixture is allowed to warm spontaneously, but is restrained from exceeding 35° C. to 40° C. The product is recovered by filtration.

The reaction is as follows:

(7)
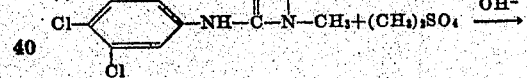
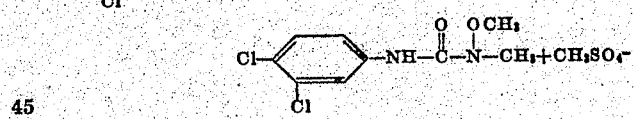

ARYL ISOCYANATE PLUS O-METHYLHYDROXYLAMINE

To a well-stirred 2%–25%, preferably 5%–15%, aqueous solution of O-methylhydroxylamine, at temperatures between −10° C. and +20° C., preferably −5° C. to +5° C., is added between 0.5 and 1, preferably .9–1, molecular equivalents of 3,4-dichlorophenylisocyanate, optionally dissolved in a water-miscible, inert solvent such as dioxane. The rate of addition will vary with the size of the run and the effectiveness of cooling, but will generally require 5 to 120 minutes, preferably 10–20 minutes.

The reaction proceeds as follows:

(8)
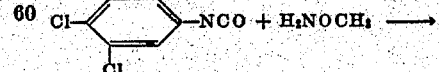
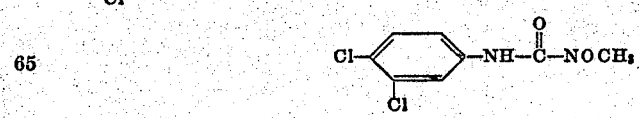

Between 1 and 2, preferably 1.2–1.5, molecular equivalents of dimethyl sulfate is added al at once to the reaction product prepared above. An aqueous solution of an alkali or alkaline earth base, preferably sodium hydroxide, is added as needed to maintain the solution in the range of pH 7–11, preferably pH 8–9. External heat is applied as needed to keep the reaction mixture at temperatures between 50° C. and 100° C., preferably 80° C.

to 90° C. To insure complete conversion of the intermediate urea to the desired product, it is found to be generally helpful to add an additional 0.5–1.5, preferably 1–1.5, molecular equivalents of dimethylsulfate after about 10–30 minutes, maintaining the pH and temperature as above. Allowing 10–30 minutes for the reaction to be completed, the product is recovered by filtration after cooling the reaction mixture to room temperature.

The reaction is as follows:

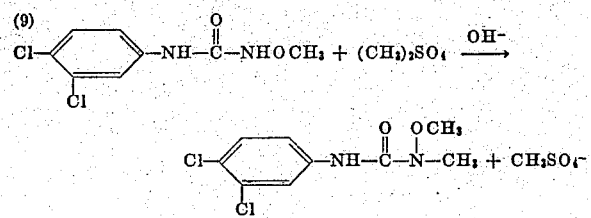

In order that the invention may be better understood reference should be had to the following illustrative examples:

*Example 1.—1-methoxy-1-methyl-3-(3,4-dichlorophenyl) urea starting with hydroxylamine*

To a well-stirred solution of 66 parts of hydroxylamine in 500 parts of water (prepared by neutralization of aqueous hydroxylamine hydrochloride with aqueous base) at temperatures between −2° C. and −5° C. is slowly added a solution of 188 parts of 3,4-dichlorophenylisocyanate in 200 parts of dioxane. Stirring is continued for 30 minutes after addition is complete and then interrupted. The solids are allowed to settle and the supernatent liquid is siphoned off. (The solids are stirred with 1000 parts of water, which is then siphoned off as above.) A solution of 110 parts of sodium hydroxide in 1000 parts of water is added to the solid residue and the slurry is refrigerated to 0°–5° C. Stirring is started, and 315 parts of dimethylsulfate is added gradually so that the temperature remains in the range of 0° C. to 5° C. To effect complete interaction, the reaction is allowed to warm up to room temperature spontaneously with continued stirring. The resulting mixture is filtered and the product dried, yielding 198 parts of essentially pure material.

*Example 2.—1-methoxy-1-methyl-3-(3,4-dichlorophenyl) urea, starting with hydroxylamine*

To a well-stirred slurry of 1-hydroxy-3-(3,4-dichlorophenyl)urea prepared as in Example 1, at temperatures between 5° C. and 10° C., 315 parts of dimethylsulfate is added gradually and concurrently with a solution of 40% sodium hydroxide so as to maintain the mixture in the range of pH 8–10. To effect a more complete interaction, stirring is continued until the combined mixture warms up spontaneously to 25° C. The product is recovered by filtration and dried.

*Example 3.—1-methoxy-1-methyl-3-(3,4-dichlorophenyl) urea, starting with N-methylhydroxylamine*

To a solution of 122 parts of nitromethane and 74 parts of ammonium chloride in 100 parts of water, stirred at 0° C.–15° C., is added a total of 300 parts of zinc dust over a three-hour period. The resulting mixture is filtered. The filtrate containing N-methyl-hydroxylamine is stirred, maintained at a temperature range of −5° C. to −2° C., while a solution of 188 parts of 3,4-dichlorophenylisocyanate dissolved in 200 parts of dioxane is added gradually. Stirring is continued for 30 minutes longer and then interrupted and the solids are allowed to settle. The supernatent liquid is siphoned off and the solids are washed with 1000 parts of water, siphoning off the wash water. To this crude reaction product is added 50 parts of sodium hydroxide in 500 parts of water, at 0° C.–5° C., stirring is resumed, and 135 parts of dimethylsulfate is added rapidly (5–10 minutes). After stirring for an additional 20 minutes, without cooling, the mixture is filtered, and the product dried.

*Example 4.—1-methoxy-1-methyl-3-(3,4-dichlorophenyl) urea, starting with O-methylhydroxylamine*

To a well-stirred solution of 47 parts of O-methylhydroxylamine in 350 parts of water (prepared from aqueous O-methyhydroxylamine hydrochloride and aqueous base) at 0° C. to 15° C., is added gradually a solution of 188 parts of 3,4-dichlorophenylisocyanate dissolved in 200 parts of dioxane. When addition is complete, stirring is continued but cooling is discontinued and 150 parts of dimethylsulfate is added all at once. A 40% solution of sodium hydroxide is added as needed to maintain the mixture in the range of pH 8–9. Simultaneously, the mixture is heated and the temperature maintained in the range of 80° C. to 90° C. After 15 minutes of continued stirring at 80° C.–90° C. the reaction is again treated with 100 parts of dimethylsulfate and sufficient alkali to maintain the pH range of 8–9. The stirring mixture is cooled gradually to 20° C. to 25° C. and filtered. The yield of essentially pure 1-methoxy-1-methyl-3-(3,4-dichlorophenyl)urea is nearly quantitative.

*Examples 5 through 12*

Following the procedure of Examples 1 through 4 other 1-methoxy-1-methyl-3-arylureas can efficaciously be prepared. The hydroxylamine and arylisocyanate employed and the products obtained are listed in Table I. The amounts of starting materials are equivalent on a molecular basis to those of Examples 1 through 4.

TABLE I

| Ex. No. | Hydroxylamine | Arylisocyanate | Product |
|---|---|---|---|
| 5 | Hydroxylamine | 4-chlorophenylisocyanate. | 1-methoxy-1-methyl-3-(4-chlorophenyl)urea. |
| 6 | do | 2,4,5-trichlorophenylisocyanate. | 1-methoxy-1-methyl-3-(2,4,5-trichlorophenyl)urea. |
| 7 | do | 2-methyl-4-chlorophenylisocyanate. | 1-methoxy-1-methyl-3-(2-methyl-4-chlorophenyl)urea. |
| 8 | do | 3-chlorophenylisocyanate. | 1-methoxy-1-methyl-3-(3-chlorophenyl)urea. |
| 9 | N-methylhydroxylamine. | 4-methylphenylisocyanate. | 1-methoxy-1-methyl-3-(4-methylphenyl)urea. |
| 10 | do | 2-methylphenylisocyanate. | 1-methoxy-1-methyl-3-(2-methylphenyl)urea. |
| 11 | O-methylhydroxylamine. | 2,4-dimethylphenylisocyanate. | 1-methoxy-1-methyl-3-(2,4-dimethylphenyl)urea. |
| 12 | do | 4-chloro-2,5-dimethylphenylisocyanate. | 1-methoxy-1-methyl-3-(4-chloro-2,5-dimethylphenyl)urea. |

I claim:
1. The process for preparing a compound of the formula:

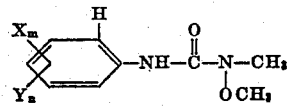

wherein
X is selected from the group consisting of hydrogen and chlorine;
$m$ is a positive integer less than 4;
Y is selected from the group consisting of hydrogen and methyl; and
$n$ is a positive integer less than 3;

which comprises reacting a compound of the formula:

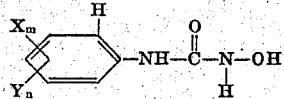

in an alkaline medium with a compound selected from the group consisting of dimethyl sulfate, methyl chloride, methyl bromide and methyl iodide.

2. The process for preparing a compound of the formula

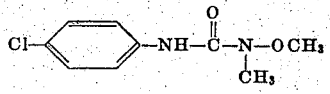

which comprises reacting a compound of the formula

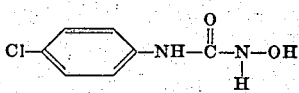

with dimethyl sulfate in an alkaline medium.

References Cited by the Examiner

UNITED STATES PATENTS

| | | | |
|---|---|---|---|
| 2,663,729 | 12/53 | Searle et al. | 260—553 |
| 2,673,878 | 3/54 | Cusic | 260—553 |
| 2,775,617 | 12/56 | Shapiro | 260—567.6 |
| 2,882,292 | 4/59 | Schlichting et al. | 260—567.6 |
| 2,902,356 | 9/59 | Luckenbaugh | 260—553 |

OTHER REFERENCES

Fieser, Organic Chemistry (third ed. 1956), pp. 136, 228, 229.

Hurd, J. Amer. Chem. Soc., vol. 45 (1925), pages 1472–89 (pages 1473 and 1481 are particularly relied on).

Noller, Chemistry of Organic Compounds, 1st ed., Saunders Co., Philadelphia, p. 136 (1951).

NICHOLAS S. RIZZO, *Primary Examiner.*

IRVING MARCUS, DUVAL T. McCUTCHEN, WALTER A. MODANCE, *Examiners.*